US 8,584,211 B1

(12) United States Patent
Vetter et al.

(10) Patent No.: US 8,584,211 B1
(45) Date of Patent: Nov. 12, 2013

(54) SERVER-BASED ARCHITECTURE FOR SECURELY PROVIDING MULTI-DOMAIN APPLICATIONS

(75) Inventors: Brian J. Vetter, Austin, TX (US); Justin Philip Marston, Austin, TX (US); David Sundstrom, Austin, TX (US)

(73) Assignee: BlueSpace Software Corporation, Austin, TX (US)

( * ) Notice: Subject to any disclaimer, the term of this patent is extended or adjusted under 35 U.S.C. 154(b) by 228 days.

(21) Appl. No.: 13/110,804

(22) Filed: May 18, 2011

(51) Int. Cl.
*H04L 29/06* (2006.01)
(52) U.S. Cl.
USPC .......... 726/4; 726/2; 726/27; 726/28; 726/29; 726/30; 713/164; 713/166; 707/786
(58) Field of Classification Search
USPC .............................................................. 726/4
See application file for complete search history.

(56) References Cited

U.S. PATENT DOCUMENTS

| | | | |
|---|---|---|---|
| 5,938,732 A | 8/1999 | Lim et al. | |
| 5,938,735 A | 8/1999 | Malik | |
| 6,003,030 A | 12/1999 | Kenner et al. | |
| 6,009,462 A | 12/1999 | Birrell et al. | |
| 6,029,175 A | 2/2000 | Chow et al. | |
| 6,035,327 A | 3/2000 | Buckley et al. | |
| 6,112,239 A | 8/2000 | Kenner et al. | |
| 6,122,632 A | 9/2000 | Botts et al. | |
| 6,134,582 A | 10/2000 | Kennedy | |
| 6,134,598 A | 10/2000 | Raman | |
| 6,138,168 A | 10/2000 | Kelly et al. | |
| 6,154,744 A | 11/2000 | Kenner et al. | |
| 6,178,160 B1 | 1/2001 | Bolton et al. | |
| 6,181,867 B1 | 1/2001 | Kenner et al. | |
| 6,182,136 B1 | 1/2001 | Ramanathan et al. | |

(Continued)

FOREIGN PATENT DOCUMENTS

EP 0739115 A2 10/1996
EP 1085444 A2 3/2001

(Continued)

OTHER PUBLICATIONS

Sauer et al., "Towards Achieving Cross Domain Information Sharing in a SOA-Enabled Environment Using MILS and MLS Technologies", 2009, pp. 1-5.*

(Continued)

*Primary Examiner* — Taghi Arani
*Assistant Examiner* — Thaddeus Plecha
(74) *Attorney, Agent, or Firm* — Fenwick & West LLP

(57) ABSTRACT

A Multilevel Security (MLS) server provides MLS functionality to single-level applications running on a remote Multiple Independent Level Security (MILS) or MLS client device. More specifically, the MLS server provides a plurality of different security domains in which applications can execute. The client device executes a single-level application in a first security domain, the single-level application not natively capable of communicating with other domains. The single-level application in the first security domain sends a request to the MLS server. The MLS server receives the request, passing it to all applicable domains, including a second security domain, where it is duly executed. The MLS server then provides the results of the request execution—if any—back to an appropriate application on the client device. For example, the single-level application in the first security domain can display the aggregated results obtained from multiple distinct security domains, or an application running in the second security domain can display the results.

17 Claims, 8 Drawing Sheets

(56) References Cited

U.S. PATENT DOCUMENTS

| | | |
|---|---|---|
| 6,185,551 B1 | 2/2001 | Birell et al. |
| 6,185,598 B1 | 2/2001 | Farber et al. |
| 6,249,807 B1 | 6/2001 | Shaw et al. |
| 6,282,569 B1 | 8/2001 | Wallis et al. |
| 6,314,565 B1 | 11/2001 | Kenner et al. |
| 6,370,571 B1 | 4/2002 | Medin, Jr. |
| 6,405,252 B1 | 6/2002 | Gupta et al. |
| 6,415,280 B1 | 7/2002 | Farber et al. |
| 6,421,726 B1 | 7/2002 | Kenner et al. |
| 6,480,893 B2 | 11/2002 | Kriegsman |
| 6,484,143 B1 | 11/2002 | Swildens et al. |
| 6,502,125 B1 | 12/2002 | Kenner et al. |
| 6,553,413 B1 | 4/2003 | Leighton et al. |
| 6,578,076 B1 | 6/2003 | Putzolu |
| 6,581,090 B1 | 6/2003 | Lindbo et al. |
| 6,694,358 B1 | 2/2004 | Swildens et al. |
| 6,704,768 B1 | 3/2004 | Zombek |
| 6,704,772 B1 | 3/2004 | Ahmed et al. |
| 6,725,228 B1 | 4/2004 | Clark et al. |
| 6,789,107 B1 | 9/2004 | Bates et al. |
| 6,850,968 B1 | 2/2005 | Pfeffer et al. |
| 6,959,382 B1 | 10/2005 | Kinnis et al. |
| 6,970,913 B1 | 11/2005 | Albert et al. |
| 7,058,687 B2 | 6/2006 | Kucherawy |
| 7,103,794 B2 | 9/2006 | Malcolm |
| 7,233,954 B2 | 6/2007 | Horvitz |
| 7,412,437 B2 | 8/2008 | Moody et al. |
| 2002/0007453 A1 | 1/2002 | Nemovicher |
| 2002/0122543 A1 | 9/2002 | Rowen |
| 2002/0136279 A1 | 9/2002 | Al-Kazily et al. |
| 2002/0144154 A1 | 10/2002 | Tomkow |
| 2003/0009595 A1 | 1/2003 | Collins |
| 2003/0055907 A1 | 3/2003 | Stiers |
| 2003/0074409 A1 | 4/2003 | Bentley |
| 2003/0126120 A1 | 7/2003 | Faybishenko et al. |
| 2003/0140223 A1 | 7/2003 | Desideri |
| 2003/0191806 A1 | 10/2003 | Osterberg, Jr. et al. |
| 2004/0039753 A1 | 2/2004 | Albaugh et al. |
| 2004/0054498 A1 | 3/2004 | Shipp |
| 2004/0054744 A1 | 3/2004 | Karamchedu et al. |
| 2004/0064515 A1 | 4/2004 | Hockey |
| 2004/0078447 A1 | 4/2004 | Malik et al. |
| 2004/0133645 A1 | 7/2004 | Massanelli et al. |
| 2004/0153515 A1 | 8/2004 | Touboul et al. |
| 2004/0177271 A1 | 9/2004 | Arnold et al. |
| 2004/0260761 A1 | 12/2004 | Leaute et al. |
| 2005/0022023 A1 | 1/2005 | Chincheck et al. |
| 2005/0054334 A1 | 3/2005 | Brown et al. |
| 2005/0086340 A1 | 4/2005 | Kang et al. |
| 2005/0138109 A1 | 6/2005 | Redlich et al. |
| 2005/0149498 A1 | 7/2005 | Lawrence et al. |
| 2005/0203929 A1 | 9/2005 | Hazarika et al. |
| 2005/0204009 A1 | 9/2005 | Hazarika et al. |
| 2005/0216745 A1 | 9/2005 | Speare et al. |
| 2006/0168029 A1 | 7/2006 | Fitzpatrick et al. |
| 2006/0265464 A1 | 11/2006 | Nassiri |
| 2007/0016583 A1* | 1/2007 | Lempel et al. ............ 707/9 |
| 2007/0038942 A1 | 2/2007 | Chen et al. |
| 2007/0100650 A1 | 5/2007 | Ramer et al. |
| 2007/0100806 A1 | 5/2007 | Ramer et al. |
| 2007/0244867 A1 | 10/2007 | Malandain et al. |
| 2007/0255942 A1 | 11/2007 | Weller et al. |
| 2007/0288575 A1 | 12/2007 | Gillum et al. |
| 2009/0216696 A1 | 8/2009 | Downs et al. |
| 2009/0319787 A1* | 12/2009 | Price ............ 713/166 |
| 2010/0049687 A1* | 2/2010 | Patten et al. ............ 706/47 |
| 2010/0161908 A1* | 6/2010 | Nation et al. ............ 711/147 |

FOREIGN PATENT DOCUMENTS

| | | |
|---|---|---|
| EP | 1085444 A3 | 4/2003 |
| WO | WO 03/036492 A1 | 5/2001 |
| WO | WO 03/073711 A2 | 9/2003 |
| WO | WO 2004/012415 A1 | 2/2004 |

OTHER PUBLICATIONS

Qian et al., "A Mandatory Access Control Framework in Virtual Machine System with Respect to Multi-level Security I: Theory", 2010, pp. 137-143.*

Kang, M.N., et al., "Design and Assurance Strategy for the NRL Pump," Naval Research Laboratory, NRL/MR/5540-97/7991, Dec. 31, 1997, pp. i-iii, 1-22.

Brussee, Rogier et al, "Content Distribution Networks", Telematica Institute, Jun. 1, 2001, pp. V-IX and 1-88.

Davison, Brian, "Brian Davison's Web-Caching Bibliography", Department of Computer Science, Rutgers, the State University, New Jersey, Jun. 28, 2000, pp. 1-16.

Edwards, W.K., "The Design an Implementation of the Montage Multimedia Mail System," Communications for Distributed Applications and Systems, Chapel Hill, Apr. 18-19, 1991; Proceedings of the Conference on Communications Software, New York, IEEE, US, vol. Conf. 4, Apr. 18, 1991, pp. 47-57.

Faden, G., "Solaris Trusted Extensions," Architectural Overview, Sun Microsystems, Apr. 2006, [online] [Retrieved on Dec. 19, 2008] Retrieved from the internet <URL: http://www.opensolaris.org/os/community/security/projects/tx/TrustedExtensionsArch.pdf>.

Faden, G., "Multilevel Filesystems in Solaris Trusted Extensions," SACMAT'07, Jun. 20-22, 2007, , [online] [Retrieved on Dec. 19, 2008] Retrieved from the internet URL:http://www.opensolaris.org/os/community/security/projects/tx/sacmatO4s-faden-1.pdf>.

Goldszmidt, German et al., "Load Distribution for Scalable Web Servers: Summer Olympics 1996—A Case Study", In Proceedings of the 8th IFIP/IEEE International Workshop on Distributed Systems: Operations and Management, Sydney, Australia, Oct. 1997, pp. 1-10.

Gwertzman, James et al., "The Case for Geographical Push-Caching", In Proceedings of the Fifth Workshop on Hot Topics in Operating Systems, IEEE Computer Society, Orcas Island, WA, May 1995, pp. 51-55.

Gupta, G., et al., "Digital Forensics Analysis of E-Mails: A Trusted E-Mail Protocol," International Journal of Digital Evidence, Spring 2004, vol. 2, Is. 4, 11 Pages.

Mambo, M., et al., "Proxy Signatures for Delegating Signing Operation," Conference on Computer and Communications Security, Proceedings of the 3$^{rd}$ ACM conference on Computer and Communications Security, 1996, pp. 48-57.

Stanford-Clark, Andy, "Atlanta Olympics WOMplex", Presented at Get Connected Technical Interchange '96, IBM, Hursley, U.K., Oct. 1996, pp. IBM 000026-000037.

Van Steen, Maarten et al, "Locating Objects in Wide-Area Systems", IEEE Communications Magazine Vo 36, No. 1, Jan. 1998, pp. 104-109.

PCT International Preliminary Report on Patentability and Written Opinion, PCT/GB2005/001845, Nov. 29, 2006, 6 pages.

International Search Report and Written Opinion, PCT/GB2005/001845, Aug. 24, 2005, 8 Pages.

International Search Report and Written Opinion, PCT/US06/024859, Apr. 26, 2007, 7 pages.

International Search Report and Written Opinion, PCT/GB2004/004609, Feb. 22, 2005, 9 pages.

International Search Report and Written Opinion, PCT/GB2004/000805, Jun. 4, 2004, 9 pages.

International Search Report and Written Opinion, PCT/GB2005/001868, Aug. 19, 2005, 8 pages.

International Search Report and Written Opinion, PCT/US2007/060587, Feb. 14, 2008, 8 pages.

* cited by examiner

SERVER-BASED ARCHITECTURE FOR SECURELY PROVIDING MULTI-DOMAIN APPLICATIONS

CROSS-REFERENCE TO RELATED APPLICATIONS

The application is related to application Ser. No. 12/191,634, filed on Aug. 14, 2008 and entitled "Application Architecture for a Secure Multi-Level Computer System", which is hereby incorporated herein by reference.

BACKGROUND

1. Field of Art

This invention pertains in general to software application architectures, and in particular to architectures for developing applications comprising application components within multiple security domains.

2. Description of the Related Art

In organizations for which computer security is a high concern, such as in military or defense-related organizations, the organizations have traditionally chosen to structure their computer information systems as a set of security domains corresponding to different levels of security. Each domain, such as "Top secret," "Secret," and "Unclassified" domains, is a labeled collection of computer resources such as files, processes, and devices that share the same security classification label corresponding to a particular security level and are governed by rules that limit or prohibit communication or sharing with computing resources in other security domains having different classification labels. Each domain has a set of authorized users who may gain access to the resources associated with that domain. The domains are typically arranged in a hierarchy of security levels according to the Bell-LaPadula model, such that some domains are more secret than, or at least as secret as, other domains. Such domains are said to "dominate" the other domains. For example, a "Top Secret" domain corresponding to a particular high security level could dominate the "Secret" and "Unclassified" domains corresponding to lower security levels, and "Secret" could dominate "Unclassified." (Domains may also be said to dominate themselves.) Information may be shared "upwards," i.e. users authorized to access information in a higher secrecy domain may view information in lower secrecy domains without constituting a security problem, but information should not be shared "downwards." For example, "Top secret" information should not be accessible from the "Secret" or "Unclassified" domains. A person, a program, or other entity is said to be "cleared" to access information at a given security level if that entity is authorized to view information at that level and any lower levels. For example, a person with authorization to access the "Top secret" level and all levels below it is said to have "Top secret clearance." However, using traditional system designs, the domains are typically physically separated. Thus, for example, a user might be obliged to have multiple computer systems at the user's desk, one for each security domain, or to go to a separate office to access a different security domain.

Some conventional computing systems do permit multiple security domains to be accessed via a single hardware unit, such as by running multiple separate instances of an operating system on a single workstation, one instance per security domain. For example, such a workstation might run an instance of MICROSOFT WINDOWS at a "Top secret" level, another instance at a "Secret" level, and another instance at an "Unclassified" level. This simulates multiple, separate networked computers associated with different security domains and is referred to as a Multiple Independent Level Security (MILS) system. However, the various domains are logically isolated from each other, such that a user logged in to a system for one security domain cannot access resources from a different security domain. Users can (if authorized) switch between the different security domains of the MILS system and can run applications within each domain, but the applications are "single-level" —that is, they run only within a single domain of the MILS system and have no knowledge of, or access to, other domains. This inability to access information from different security domains makes MILS systems cumbersome and ineffective. For example, using a MILS system in which a user was logged into the "Top Secret" domain, the user could access files and messages associated with the "Top Secret" domain, but would be obliged to log in separately to the "Secret" domain to access files and messages associated with the "Secret" domain. Further, the user would have to access each security domain (e.g., each operating system instance) within its own separate window representing that domain, since the different domains cannot interact, much less comingle information from different domains within the same window.

A Multilevel Security System (MLS) provides the ability to access resources associated with one security domain from within a different security domain. For example, an MLS system will not only permit applications that are running at separate security levels to simultaneously share a monitor, keyboard, and mouse (for example), but will also permit an application with sufficient privileges to access data and services from multiple distinct domains. For example, an MLS desktop will display applications from multiple levels each in their own window on the desktop, as opposed to having them run in their own, separate, "virtual" desktop as in a MILS system). However, creating MLS-enabled applications that do not inadvertently compromise the security of the different domains can be difficult. One approach is for application creators to rely on trusted middleware that has been certified to manage the inter-domain communication in a manner that does not compromise security. However, even trusted middleware can pose a security threat in the case of systems where intruders may gain administrative privileges. This is particularly the case for client systems, where security settings are typically less rigorously administered than on server systems, and where direct access to the system is much more common than with servers, which can generally only be accessed remotely.

Additionally, many MLS-enabled applications rely on the underlying operating system to itself provide basic MLS functionality, such as SOLARIS system calls that change the security label identifying the domain with which a particular resource is associated. However, many popular operating systems, such as MICROSOFT WINDOWS, do not provide the mechanisms, such as labeling files and processes, that are used to implement MLS functionality. Thus, these "single-level" operating systems cannot run MLS applications, and users wishing to use MLS applications are therefore limited to operating systems that provide the requisite MLS functionality. This restriction is a disappointment to many users, who would prefer to be able to use their favorite operating systems and the associated applications.

SUMMARY

In one embodiment, an MLS server provides MLS functionality to single-level applications running on a remote MILS or MLS client device. More specifically, the MLS server provides a plurality of different security domains in which applications can execute. The client device executes a single-level application in a first security domain, the single-level application not natively capable of communicating with other domains. The single-level application in the first security domain sends a request to the MLS server. The request may potentially be executed in any of the domains, including a domain different from the domain of the single-level application. For example, the single-domain application on the client might be an email client application running in a "Top secret" domain and might send a request for all emails in all domains dominated by the "Top Secret" domain, including "Secret" and "Unclassified" domains. This request would then be executed in each of the domains—that is, "Top Secret", "Secret", and "Unclassified"—in order to obtain the emails in each of the domains.

The MLS server receives the request, passing it to all applicable domains, including the second security domain, where it is duly executed. The MLS server then provides the results of the request execution—if any—back to an appropriate single-level application in the client device. As one example specific to email applications, the MLS server might provide the request for emails to each email application server running in each applicable domain, then aggregate the resulting email messages (or subject headers, or the like) from the different email application servers, providing the aggregated emails back to the single-level application in the first security domain on the MILS client device, where they are displayed. Or, depending on the nature of the request, the results might be displayed to an application running in a second security domain and displayed within a user interface of that application. Thus, the cross-domain execution of the request on the server permits the server to provide the client with data for an application that spans a plurality of different security domains. Then, for example, when a user of the client selects email subject headers obtained from various domains, the MLS server obtains the corresponding email contents from the application servers in the appropriate domains, and the client device displays the emails in their own windows. This allows securely orchestrating and updating windows associated with different domains, for example.

The domains on the MLS server may be implemented in different manners in different embodiments. In one embodiment, the domains are implemented by a separation kernel, which hosts a number of virtual machine/hypervisor instances, each corresponding to a domain. Each instance in turn assigns resources (processes, devices, etc.) to its corresponding domain and executes a single-level operating system—i.e., a commercial off-the-shelf operating system such as MICROSOFT WINDOWS supporting only a single security level—providing the operating system with access to the resources associated with that domain. Using the techniques disclosed herein, MLS features are provided even to applications running on a single-level operating system instance that lacks MLS capability. In another embodiment, the domains are implemented by an operating system natively offering basic MLS functionality, such as SOLARIS 10 with Trusted Extensions, or operating systems implementing Security-Enhanced Linux features. In still another embodiment, the domains are implemented by thin client servers accessed from the client via the Remote Desktop Protocol.

In one embodiment, each domain has one or more application servers that provide the data and functionality appropriate for that domain. For example, in the case of a mail application, each domain would have a mail server (either hosted at a remote location or executing on the MLS server itself) that provides access to electronic mail messages for that domain.

In one embodiment, the inter-domain communications are provided by a trusted service bus that is implemented using techniques appropriate for the particular domain implementation that the server employs. For example, in an embodiment in which the domains are implemented using an MLS operating system providing a multi-level port for inter-domain data transfer, the trusted service bus runs at a sufficiently high security level to use the multi-level port and provides controlled access to the port. As another example, in one embodiment in which the domains are implemented using different operating system instances running in different virtual machines/hypervisors, the trusted service bus uses hypervisor system calls to transfer data to memory shared between the hypervisors. As still another example, in another embodiment in which the domains are implemented using different operating system instances running in different virtual machines/hypervisors, the trusted service bus uses a private network interface created and managed by the separation kernel and hypervisor to communicate via the different partitions.

In one embodiment, each domain has a request adapter that facilitates data exchanges between the trusted service bus and the application server(s) for that domain. For example, in response to a client request for message headers of recent email messages from any of the domains, the request adapter for the domain receiving the client request would create a request for each of the other domains and distribute the requests to the request adapters in the other domains via the trusted service bus. The request adapters in the other domains then distribute the requests to the application servers in their respective domains, receive the resulting message headers, and provide them via the trusted service bus to the request adapter in the domain receiving the client request. That request adapter in turn aggregates the received message headers and forwards them to the client.

In one embodiment, a server is not employed. Rather, a MILS client device is directly provided with an application that spans a plurality of different security domains through execution of a set of virtualized single-level operating system instances. For example, the client device might run a plurality of instances of MICROSOFT WINDOWS within a hypervisor, each instance running at a different security level, with a trusted service bus adapted for use with hypervisors providing the inter-domain communication.

The techniques disclosed herein provide a number of advantages over conventional techniques. First, isolating the inter-domain MLS capabilities of the trusted service bus on the server 120 provides more robust security than including such functionality on a client, given that clients typically pose a much greater security risk than servers. For example, users rarely have the opportunity to log in directly to a server, making the server less likely than a client to be compromised. Second, embodiments that implement the domains using mechanisms such as hypervisors to host multiple single-level operating systems provide MLS capabilities to applications while still allowing clients their choice of operating systems. Since the applications provided by the server 120 are neutral with respect to the operating systems run by the clients 110, the users can select the operating systems of their choice.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
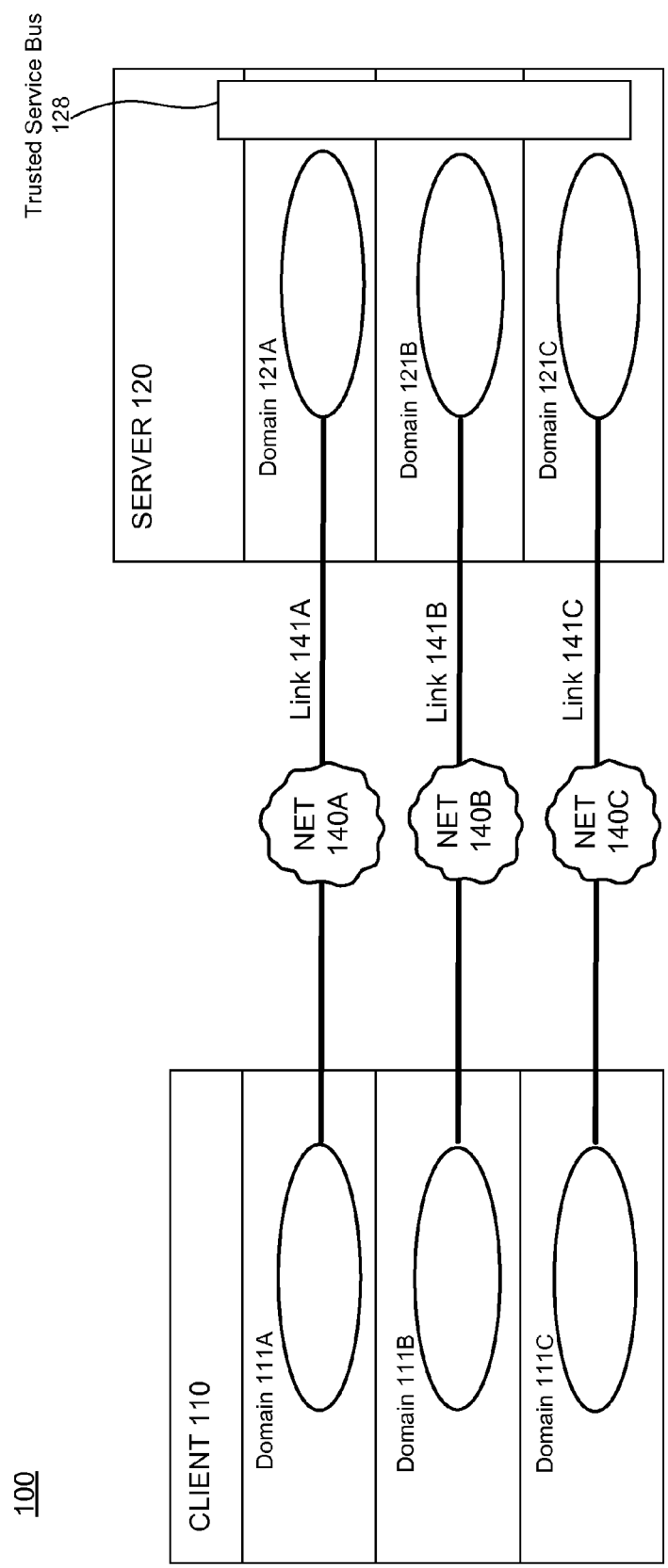
FIG. 1 is a high-level block diagram of a multi-domain computing system 100 according to one embodiment.

FIG. 1 is a high-level block diagram of a multi-domain computing system 100 according to one embodiment. A domain is a computing environment provided by the software of a computing system, such as an operating system or a virtual machine, and sharing in the physical resources of the system. The domain acts as a separate logical computing system and represents a particular security level, such as "Top secret" or "Unclassified." Each domain has a set of associated users belonging to the domain, who are authorized to use the resources of the domain. Security controls generally prohibit one domain from accessing other domains—that is, resources of one domain, such as files, ports, applications, and the like, are directly accessible only through that domain. The manner in which the security controls are implemented depends in turn on how the domains are implemented, e.g., as an operating system instance within a virtual machine, as a multi-level operating system, and the like, as is discussed in more detail below. Domains may be ordered hierarchically according to the security levels that they represent. For example, in FIG. 1, Domain 121A might represent a "Top secret" security level, which dominates a "Classified" security level of Domain 121B, which is in turn dominates an "Unclassified" level of Domain 121C.

FIG. 1 illustrates a Multiple Independent Level Security (MILS) client 110 in communication with a Multilevel Security System (MLS) server 120. (As previously noted, a MILS system is one in which a user or application belonging to one security domain cannot natively access resources for a different security domain, whereas an MLS system, in contrast, natively provides the ability to access resources in different security domainsdomain.) The MILS client 110 may include a plurality of distinct security domains 111, but it has no direct ability to facilitate inter-domain communication, as in an MLS system. The MLS server 120 likewise includes a plurality of distinct security domains 121 corresponding to those of the client 110—for example, domain 111A on the client to the same as domain 121A on the server, in that they are both accessible to users with the same security credentials—but it additionally comprises a trusted service bus 128 that permits inter-domain communications.

The client 110 can use the server 120 to provide an MLS application experience to users, even though the client itself does not have MLS capabilities. For example, an application running in domain 111A on the client 110 might send a request for data for a given application (e.g., a mail application) over a network 140 to the server 120, which would securely distribute the request to each domain using the trusted service bus 128 and return the results (if any) to the client 110.

The networks 140A-C represent the communication pathways between the domains 111, 121 on the client 110 and the server 120. In the embodiment depicted in FIG. 1, in order to achieve maximum physical security, each of the networks 140 has its own physical link 141 that is physically separate from those of the other networks. In another embodiment, the different networks 140 are implemented using a single physical link, with software segmenting the single link into multiple logical network paths. For example, a virtual private network (VPN) path could be created between each of the corresponding domains, such as one VPN path between domains 111A and 121A, one between domains 111B and 121B, and one between domains 111C and 121C.

In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Although FIG. 1 depicts three domains on the client 110 and on the server 120, it is appreciated that there may be any number of domains. Likewise, it is appreciated that although FIG. 1 depicts only one client 110 and one server 120, there could be any number of either. For example, there could be many clients in communication with a single server 120. In one embodiment, there is a distinct server 120 for each application which a client 110 wishes to use. Examples of single-level applications that may be orchestrated by the servers 120 to provide a multi-level application experience include, for example:

Email, chat, and other messaging applications integrating messages from different security domains within a single inbox or messaging window. See, for example, the discussion associated with FIG. 4, below.

Command-and-control ("C2") systems integrating information on positions of aircraft or other military equipment from separate military systems representing different security domains. For example, the information on equipment tracked by the different systems can be aggregated by the server 120 and provided to the client 110 for display within a dashboard interface. Information on any particular item of equipment can then be obtained from the appropriate security zone via the server 120.

Search systems integrating search results for content available from different security domains. For example, documents (e.g., web pages) stored in different security domains can be located using a single search and links to all the documents displayed together within a single web-based user interface.

Figure 2:
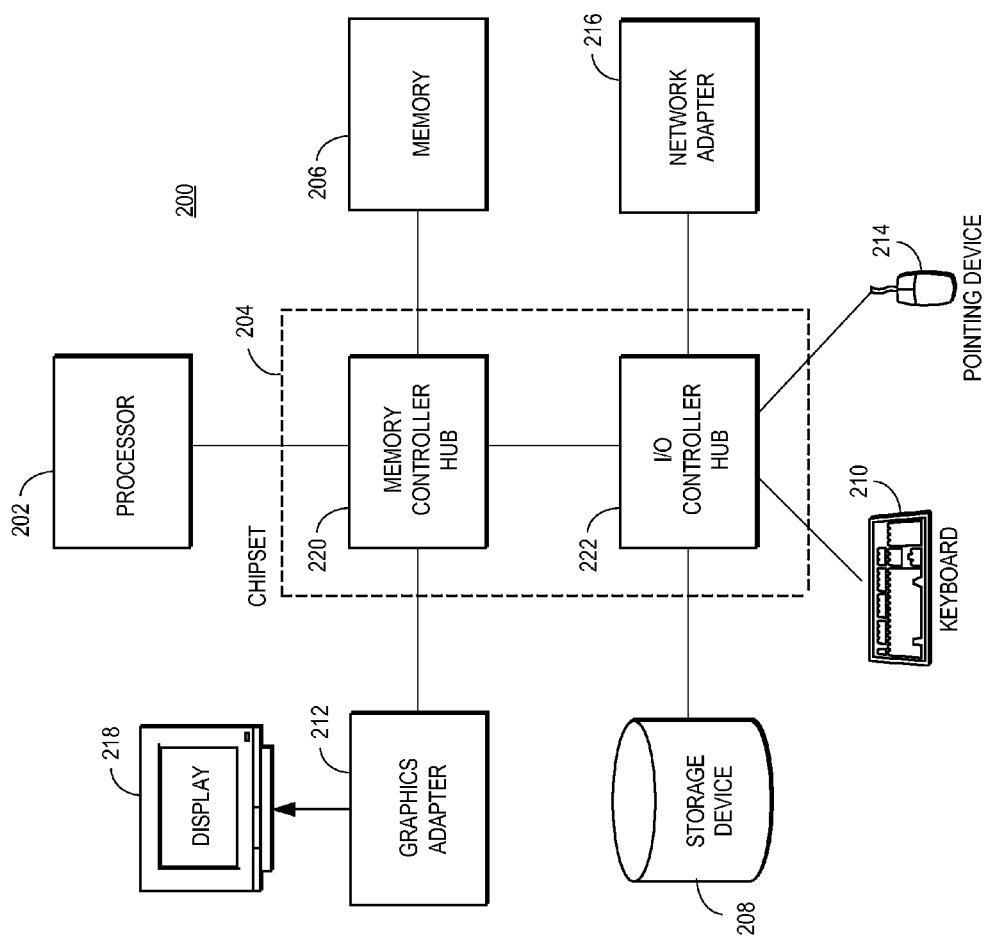
FIG. 2 is a high-level block diagram illustrating a computer 200 that can provide domains and function as the client 110 or the server 120, according to one embodiment.

FIG. 2 is a high-level block diagram illustrating a computer 200 that can provide domains and function as the client 110 or the server 120, according to one embodiment. Illustrated are at least one processor 202 coupled to a chipset 204. Also coupled to the chipset 204 are a memory 206, one or more storage devices 208, a keyboard 210, a graphics adapter 212, a pointing device 214, and one or more network adapters 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network. In some systems for MILS and MLS environments, there are multiple network adapters 216 and storage devices 208, one per security level.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3A:
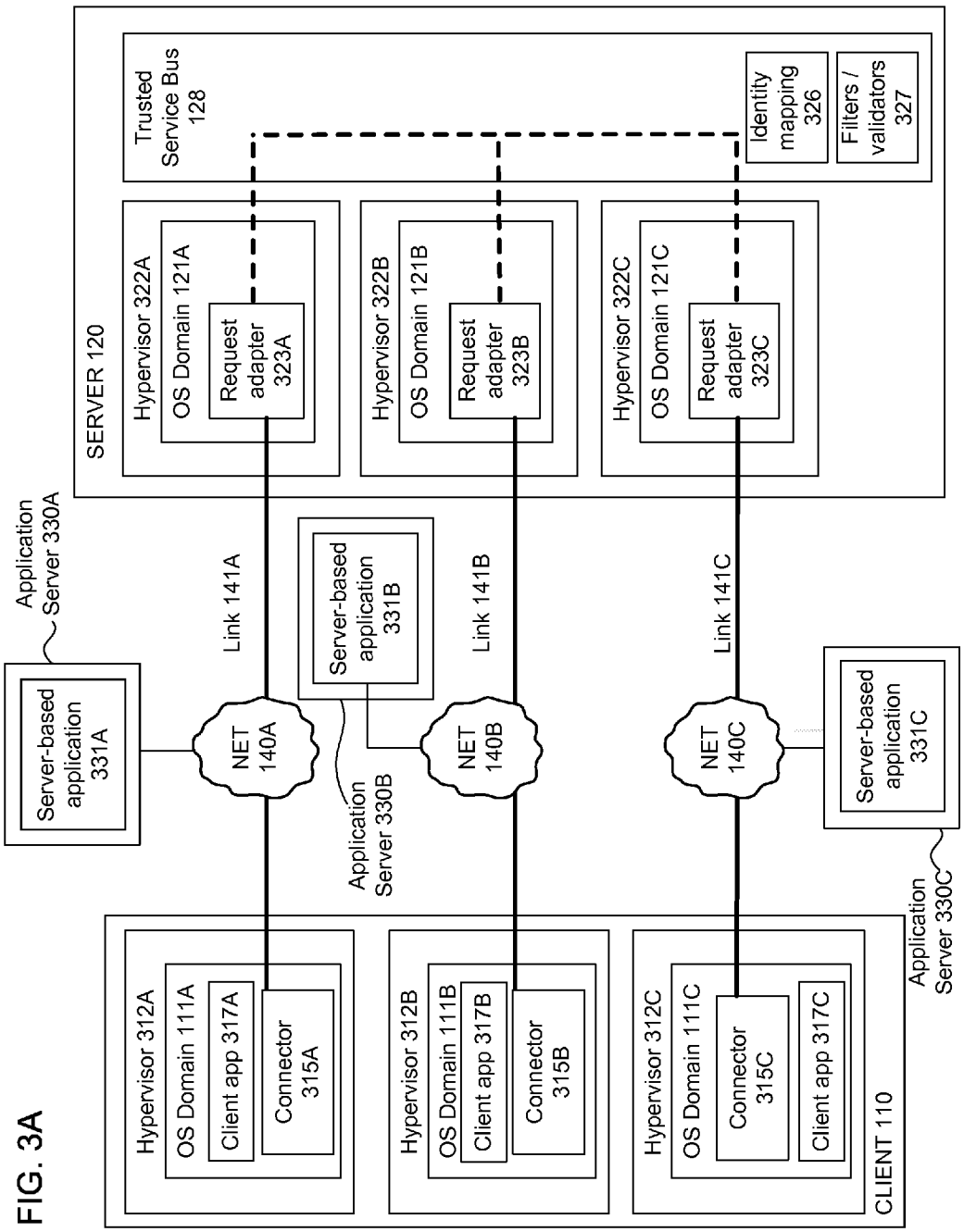
FIGS. 3A-3C are more detailed block diagrams of a multi-domain computing system of FIG. 1, according to various embodiments.

FIG. 3A is a more detailed block diagram of the multi-domain computing system 100 of FIG. 1, according to one embodiment. The system 100 carries out a request of a client application 317 for data from one or more of the domains 111, 121. The client application 317 may be a custom client program, or it may be a web-based application running in a browser such as INTERNET EXPLORER or FIREFOX.

Specifically, FIG. 3A depicts an embodiment in which the domains 111, 121 are implemented using operating system instances running within hypervisors modules. A hypervisor module (also referred to for simplicity as a "hypervisor") is an implementation of a virtual machine that presents a virtual operating platform to a guest operating system that executes within it, and also monitors the execution of the guest operating system. A "type 1" hypervisor runs directly on the hardware of a computer device, such as the client 110 or server 120, and provides a small operating system-like environment in which other operating systems or processes can execute. A "type 2" hypervisor runs within a conventional operating system environment, and other operating systems and processes run within the type 2 hypervisor. Some commercially-available type 1 hypervisors include ESX from VMWARE and XENCLIENT from CITRIX; type 2 hypervisors include FUSION from VMWARE and VIRTUALBOX from ORACLE.

Specifically, the client 110 has a set of distinct hypervisor instances 312, each of which runs an operating system (OS) instance 111 associated with a particular domain. Similarly, the server 120 has a set of distinct hypervisor instances 322 and operating system instances 121. Each operating system instance 111, 121 is one executing instance of a single-level operating system running in a particular domain. For example, the operating system could be a version of MICROSOFT WINDOWS—a single-level operating system not offering MLS functionality—with the instance 111A running at a first level and constituting a first domain, the instance 111B running at a second level and constituting a second domain, and the instance 111C running at a third level and constituting a third domain. The different security levels of the different instances might be due, for example, to different login credentials provided to each instance, such as the credentials of a particular user for the "Top secret", "Secret", and "Unclassified" domains of a system, respectively.

The login accounts for a given user may differ in each domain. For example, a user named Charles Williams might have a user name "cwilliams" in domain 121A, "charles_williams" in domain 121B, and "charlesw" in domain 121C, for example, as well as possibly having different passwords or authentication techniques, such as password authentication versus PKI authentication. In one embodiment, each OS domain 121 handles its own authentication.

The server 120 executes a trusted service bus 128 that provides MLS functionality by permitting communication between the different domains 121. The trusted service bus 128 integrates with the operating system instances 121 running within the hypervisors 322, such that data may be provided to and obtained from the different operating system instances without violating their security constraints. In one embodiment, the trusted service bus 128 is an administratively-controlled message bus that passes messages between the different operating system instances 121 by placing the message data within a shared memory area accessible to all the hypervisors 122 and the operating system instances 121 running in them. In one embodiment, the trusted service bus 128 runs within a separate hypervisor in its own domain, distinct from domains 121A-121C. By encapsulating the inter-domain communication operations in the trusted service bus 128, only the trusted service bus itself—and not the actual applications or other middleware components that use it—need be certified as providing proper security and not posing a potential security threat. This property is beneficial, given the extensive time and resources needed to review and certify the security of software.

In one embodiment, the trusted service bus 128 comprises an identity mapping module 326 that handles translation of identities in the different domains 121. Referring to the above example, the identity mapping module 326 would record the fact that a user is identified as "cwilliams" in domain 121A and "charles_williams" in domain 121B, and thus would accordingly translate a request coming from user with identifier "cwilliams" in domain 121A to a request from a user with identifier "charles_williams" when submitting the request to domain 121B.

Each domain 121 has one or more corresponding server-based applications 331 that provide access to data and functionality used by that particular application. For example, a server-based application 331 for a mail application, such as TRANSMAIL created by BLUESPACE SOFTWARE CORPORATION, or OUTLOOK created by MICROSOFT CORPORATION, provides access to data for electronic mail messages. In one embodiment, the server-based applications 331 execute on application server devices 130A that are located remotely from the server 120 and accessible via the network 140. In another embodiment, the server-based applications 331 execute on the server 120, within the corresponding operating system instance, such as the server-based application 331A executing within the operating system instance 121A. The data for the server-based application 331 need not be located on the same hardware device that executes the server-based application. For example, the data may be stored externally in a remote data source, such as mail data being stored on a remote EXCHANGE server, with the server-based application 331 contacting the remote data source to obtain the data.

The server 120 and the client 110 additionally comprise components to facilitate the inter-domain communications. Specifically, each operating system instance 121 (i.e., a domain, in the embodiment of FIG. 3A) of the server 120 comprises a request adapter 323 that mediates access to the trusted service bus 128, receiving requests directed to the trusted service bus and data results provided via the trusted service bus by a request adapter from another domain. On receiving a request for data communication with the trusted service bus, the request adapter 323 authenticates the request as coming from a server-based application 331 in the same domain. A request adapter 323 may also aggregate data from different domains before providing it to the requesting client 110. For example, a request from a client 110 in a first domain for data in multiple domains is sent to the request adapter 323 in the first domain, which distributes the request to the other applicable domains, receives any results from those domains, and then provides the results back to the client. In one embodiment, the request adapters 323 are implemented as web services.

In one embodiment, the trusted service bus 128 employs filters and/or validators 327 when passing a message between domains. In one embodiment, the message types are broadly classified as either a request or a response, with defined fields for each. For example, a request format could comprise a version number string, a request type string, a set of request arguments, and a message body having its own format specific to the application and the type of the request. Similarly, a response format could comprise a version number string, a response type string, a status value, and output data. In one embodiment, message length is confined to a maximum value, e.g. to 128 bytes for each of the headers and 8 KB for the overall message, which reduces the possibility of the messages being used for malicious purposes such as buffer overflow attacks. In this context, the trusted service bus 128 uses validators or filters 327 to ensure that the message formats and lengths satisfy specified criteria, with validators returning a Boolean yes/no answer, and filters instead potentially modifying the message data in order to make it conform to specified criteria. As one example, a validator 327 for a "Create folder" request message in a mail application could reject a request to create a folder name that contains a word from a given list of banned words. A filter 327 for the same objective could permit the creation of the folder but instead replace the banned words of the folder name with comments or asterisks, or strip them out entirely, for example. In either case, the decisions made by the validators or filters 327 can be logged. As another example, an operation frequency validator could be used to determine that a particular operation is not being requested more frequently by a particular user than a human would likely be able to accomplish. For instance, more than one "create folder" operation per second might be rejected by a frequency validator on the assumption that such operations are being requested by a (possibly malicious) process rather than by a human user.

In one embodiment, the filters and/or validators 327 are separate processes running in the same domain as the trusted service bus 128. In one embodiment, the filters or validators 327 are specific to the server-based application 331 to which the server 120 is directed, such as messaging or search; in other embodiments, they are separate from the application and are instead defined by administrators or information assurance analysts affiliated with the system on which the application is installed, which permits site-based validation schemes to be implemented without changing components of the application itself. In one embodiment, the criteria checked by the filters or validators 327 are encoded within the filters or validators themselves; in another embodiment, the criteria are specified externally, such as via data files containing rules.

In one embodiment, each operating system instance 121 (domain) of the client 110 comprises a connector 315. The connector 315 is a module that establishes a connection with the server-based application 331 in the corresponding domain. Specifically, the connector 315 authenticates the user with the server 120 using techniques such as accounts/passwords, PKI certificates, Windows Domain Authentication, and the like. In some embodiments, users can manage the authentication information via user interfaces such as system tray application in MICROSOFT WINDOWS. As part of the authentication process, the server will cache the principal information obtained from the login and will use that information as an aid to identify messages to be sent to the connector 315 from an application in another domain. The connector 315 additionally receives the data (if any) or references thereto provided from the server-based applications 331 by the request adapters 323, and causes the display of any data or data references in the appropriate window or windows. For example, the connector 315 for a given domain might receive a URL reference such as https://owa.exchange-server.local-domain/retrievemsg?id=1234567 identifying a particular email message accessible to that domain, and could accordingly instantiate a web browser window component to fetch and display the message from the mail specified in the URL domain, specifying the desired size and location of the web browser window. As another example, when displaying the data within a MICROSOFT WINDOWS component using a component object model (COM) interface, the connector 315 specifies COM-specific information, such as the identity of the COM interface and any arguments to the object creation function needed to instantiate the corresponding COM object. Different windows may represent data from different domains, or data from different domains may be represented within a single window.

As a variant of the embodiment of FIG. 3A, the hypervisors 322 need not be type 1 hypervisors running directly on the hardware of the server 120. Instead, the server 120 might run a separation kernel—such as INTEGRITY by GREEN HILLS SOFTWARE, LYNXSECURE by LYNXWORKS, or VXWORKS by WIND RIVER SYSTEMS—which in turn hosts type 2 hypervisors 322.

Figure 3B:
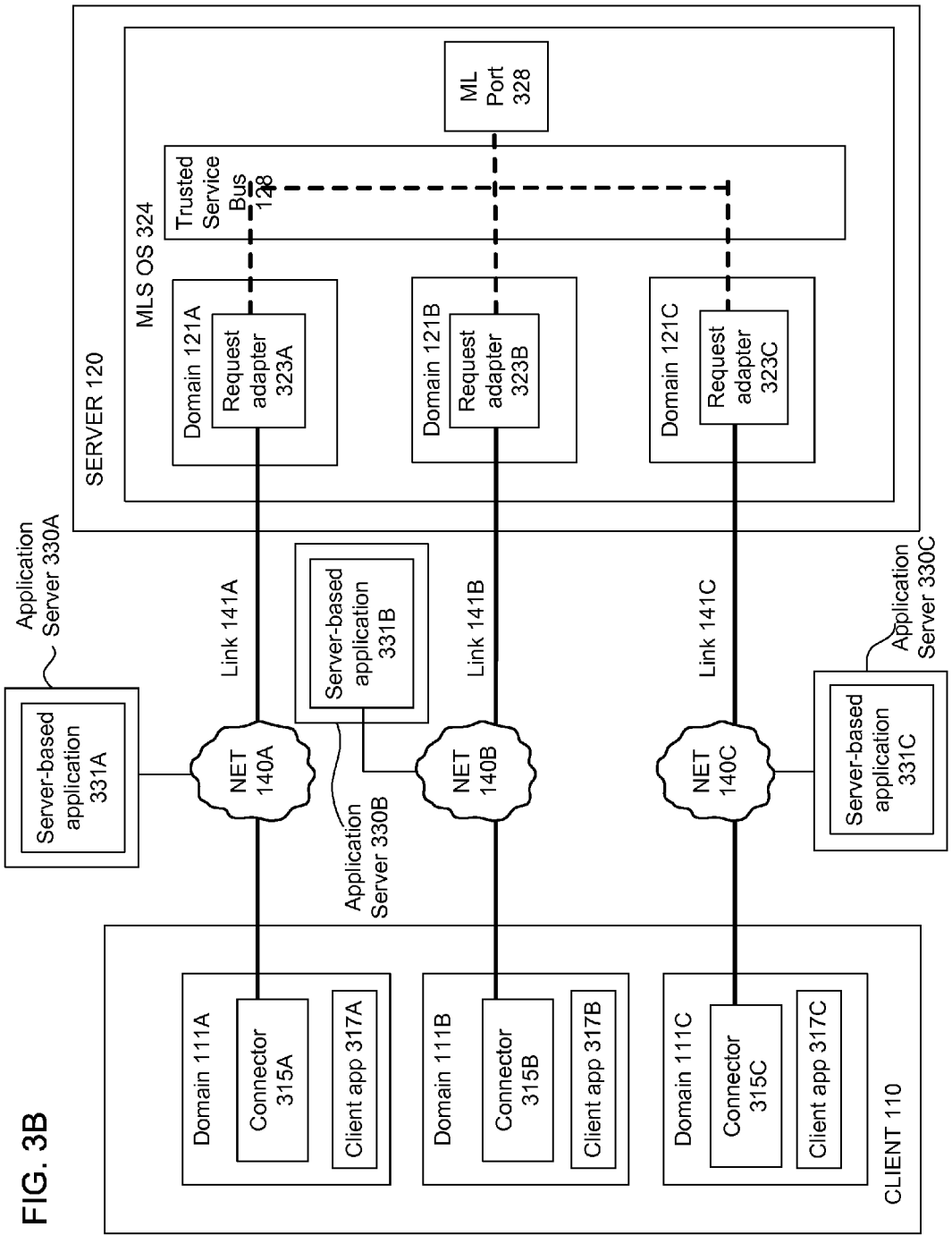

FIG. 3B is a more detailed block diagram of a multi-domain computing system 100 of FIG. 1, according to one embodiment. Specifically, FIG. 3B depicts an embodiment in which the domains 121 are implemented using an MLS operating system 323 that natively provides some support for domains. One example of such an MLS operating system is SOLARIS 10 with Trusted Extensions (TX).

The client 110, the network 140, and the application servers 330 need not significantly change from the embodiment of FIG. 3A. However, the manner in which the server 120 provides inter-domain communication differs. In one embodiment, the MLS operating system 323 provides a multi-level port 328 that allows communication between different domains of the MLS operating system. The trusted service bus 128 runs in a process with sufficiently high operating system privileges to use the multi-level port 328. As one example of an inter-domain communication within the embodiment of FIG. 3B, a request from Domain 121A destined for domain 121C is received at the request adapter 323A, which provides it to the trusted service bus 128. The trusted service bus 128 in turn writes the request to domain 121C via the multi-level port 328, and the request is received by the request adapter 323C. Results of the request, if any, may likewise be written back to Domain 121A via multi-level port 328.

The domains 111 on the client 110 are likewise implemented using an MLS operating system in the example of FIG. 3B. However, as explained below, the implementation of the domains on the client 110 need not be the same as that on the server 120. Thus, the client 110 might equally well implement its domains using the hypervisor modules of FIG. 3A.

More detail on the use of a domains and a multi-level port for providing inter-domain communication in a MLS operating system is provided in U.S. patent application Ser. No. 12/191,634, filed on Aug. 14, 2008, and entitled "Application Architecture for a Secure Multi-Level Computer System," which is incorporated by reference herein.

Figure 3C:
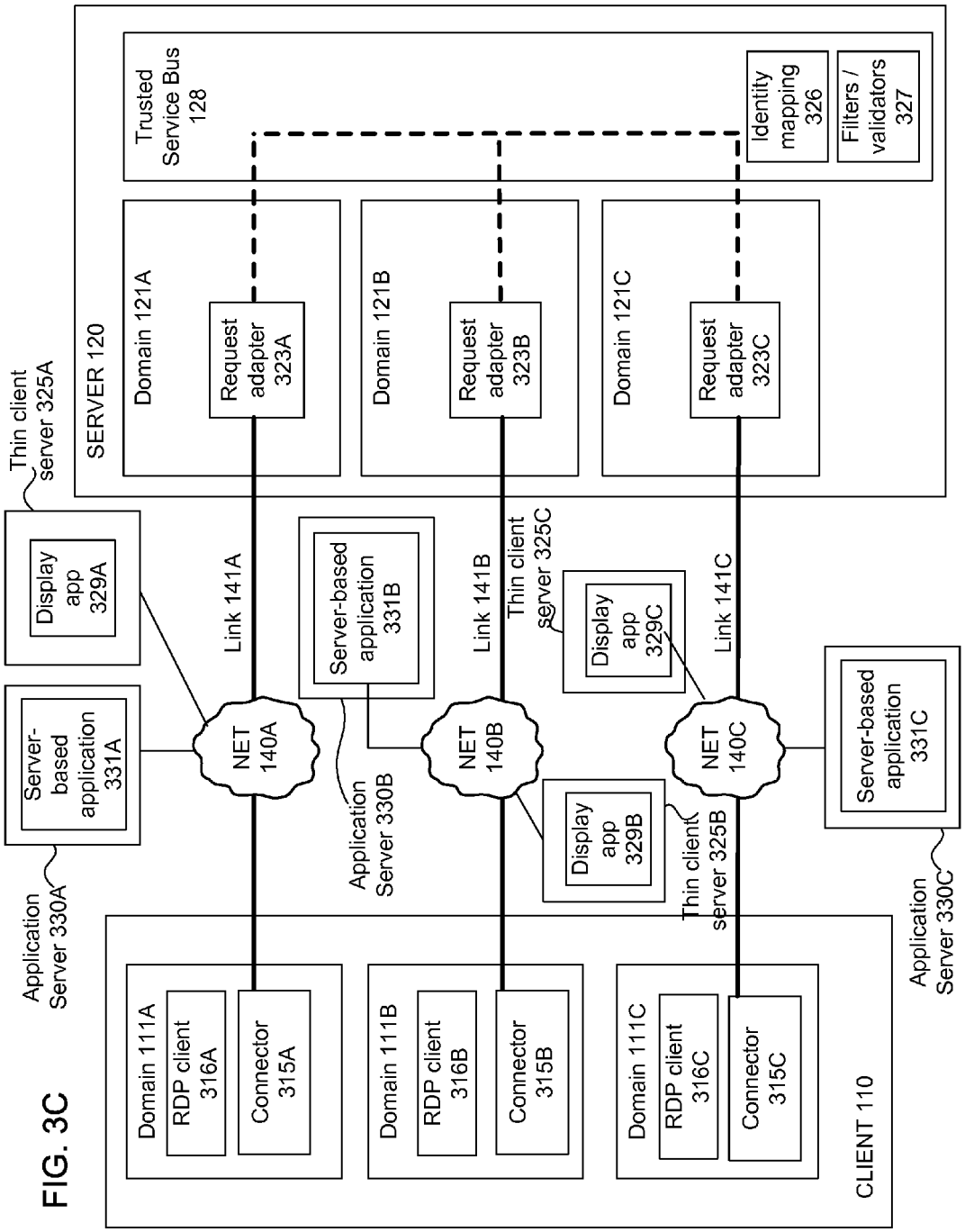

FIG. 3C is a more detailed block diagram of a multi-domain computing system 100 of FIG. 1, according to one embodiment. Specifically, FIG. 3C depicts an embodiment based on a remote desktop protocol (RDP). An RDP client 316 running a domain 111 displays the data resulting from application requests. The RDP client 316 connects to a corresponding thin client server 325, such as a WINDOWS TERMINAL SERVICES server process, and provides a request, such as a request to obtain emails (or email headers). The thin client server 325 invokes a display application 329 used to carry out the request, such as the INTERNET EXPLORER browser, which then connects to the corresponding application server 330 for that domain. The connector 315 can run on the thin client server 325 (not depicted in FIG. 3C), in which case the connector creates application windows on the server 120 and displays them on the client 110 via the RDP client 111. Alternatively, the connector 315 can run within the domain 111 as depicted in FIG. 3C, in which case it either creates local application windows that connect to the application servers 330, or uses the RDP client 316 to connect to the thin client servers 325, which in turn connects to the application servers 330 via the display applications 329.

Although in FIGS. 3A and 3B the client 110 and the server 120 are illustrated as having the same implementations—that is, both client and server having domains implemented by hypervisor modules in FIG. 3A, and both being implemented by an MLS operating system such as Solaris 10 TX—the client and server may also be implemented in different manners. For example, the client 110 could have domains implemented by an MLS operating system, and the server 120 could have domains implemented by hypervisor modules.

Figure 4:
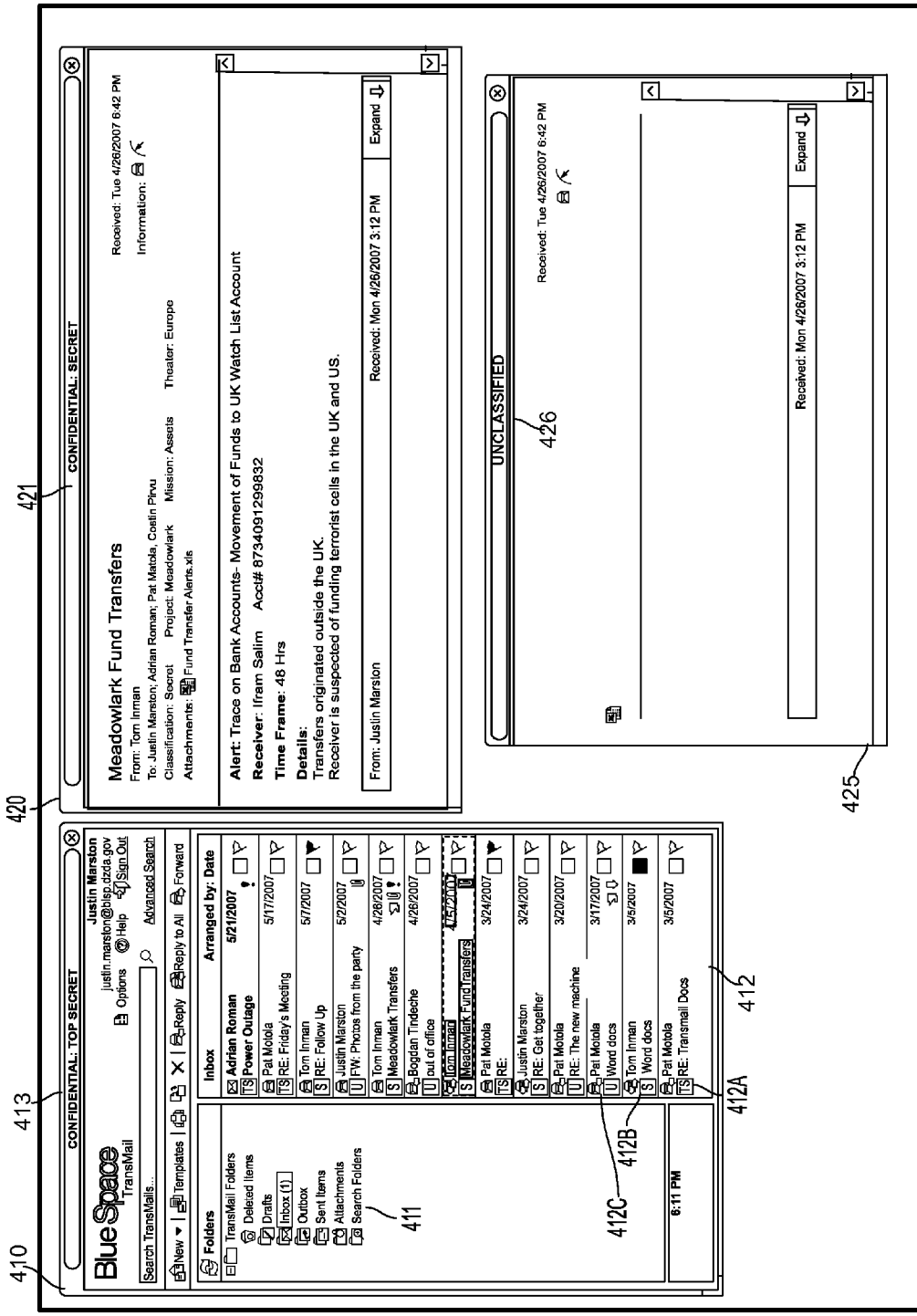
FIG. 4 is a screenshot illustrating an example of a graphical user interface created by a messaging application on the display of a computer system according to one embodiment.

FIG. 4 is a screenshot illustrating an example of a graphical user interface created by the connector 315 for a messaging application on the display 218 of a computer system, according to one embodiment. Within the main desktop area 405 are a primary window 410 and two message view windows 420, 425. The primary window 410 is a main window that displays a folder area 411 comprising the various folders to which the user has access, as well as a message area 412 comprising the messages stored in the folders. Each of the messages in the message area 412 has an indicator of the domain in which the message is stored. For example, messages 412A-C have indicators with the letters "TS", "S", and "U," which respectively correspond to the "Top Secret," "Secret," and "Unclassified" domains 121A-C. A security label 413 of the primary window 410 indicates that the application process displaying the primary window 410 is running in the "Top secret" Domain 121A of FIG. 3. Message view window 420 is a window displaying the details of the message previously selected from among the messages 412 and is displayed in association with the primary window 410, e.g. next to it. Note that the security label 421 of the message view window 420 indicates that the message data displayed in the message view window 420 came from the "Secret" domain 121B of FIG. 3. Similarly, the message view window 425 has a security label 426 that indicates that the message data displayed in the message view window 425 came from the "Unclassified" domain 121C of FIG. 3. Thus, different windows of the messaging application display data coming from different security domains yet appear on the display 218 together as one integrated application.

In the embodiment depicted in FIG. 4, the connector 315 uses seamless windowing for the graphical user interface. With seamless windowing, rather than displaying each operating system instance (domain) within a window displaying the distinct desktop of that instance, and displaying the data for that instance within sub-windows of the desktop window, the connector 155 instead displays the data for the different instances in different windows, each with an indication of the security domain to which the data correspond. Thus, rather than the main desktop area 405 displaying a sub-desktop area for each of the "Top secret", "Secret", and "Unclassified" domains corresponding to three operating system instances, and with each sub-desktop area respectively displaying the windows 410, 420, and 425, the main desktop area 405 instead directly contains the windows 410, 420, and 425.

Figure 5A:
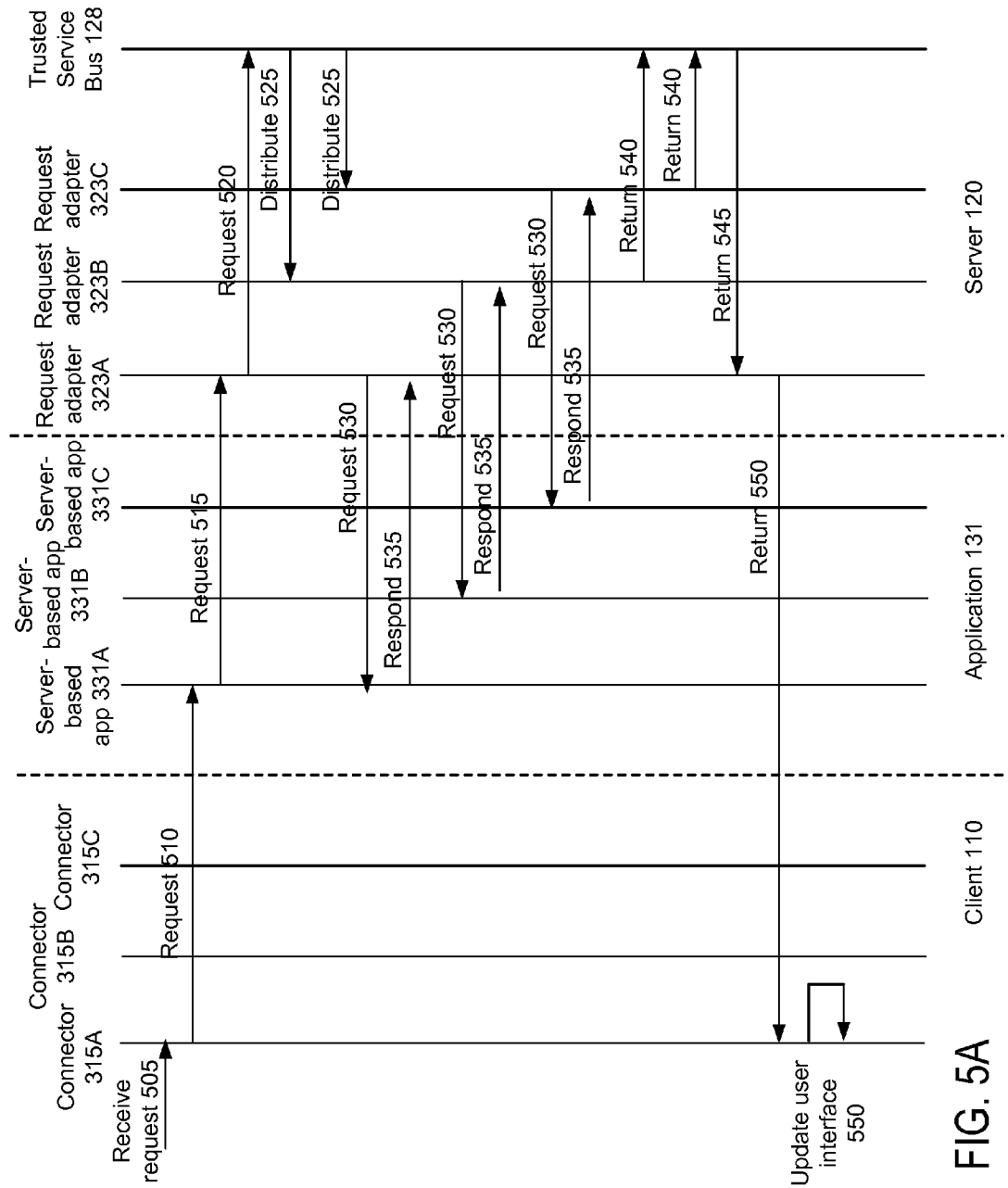
FIGS. 5A and 5B illustrate interactions within the environment of FIG. 1 to make requests of other domains in the context of operations of a multi-level application such as that depicted in FIG. 4, according to one embodiment.
Figure 5B:
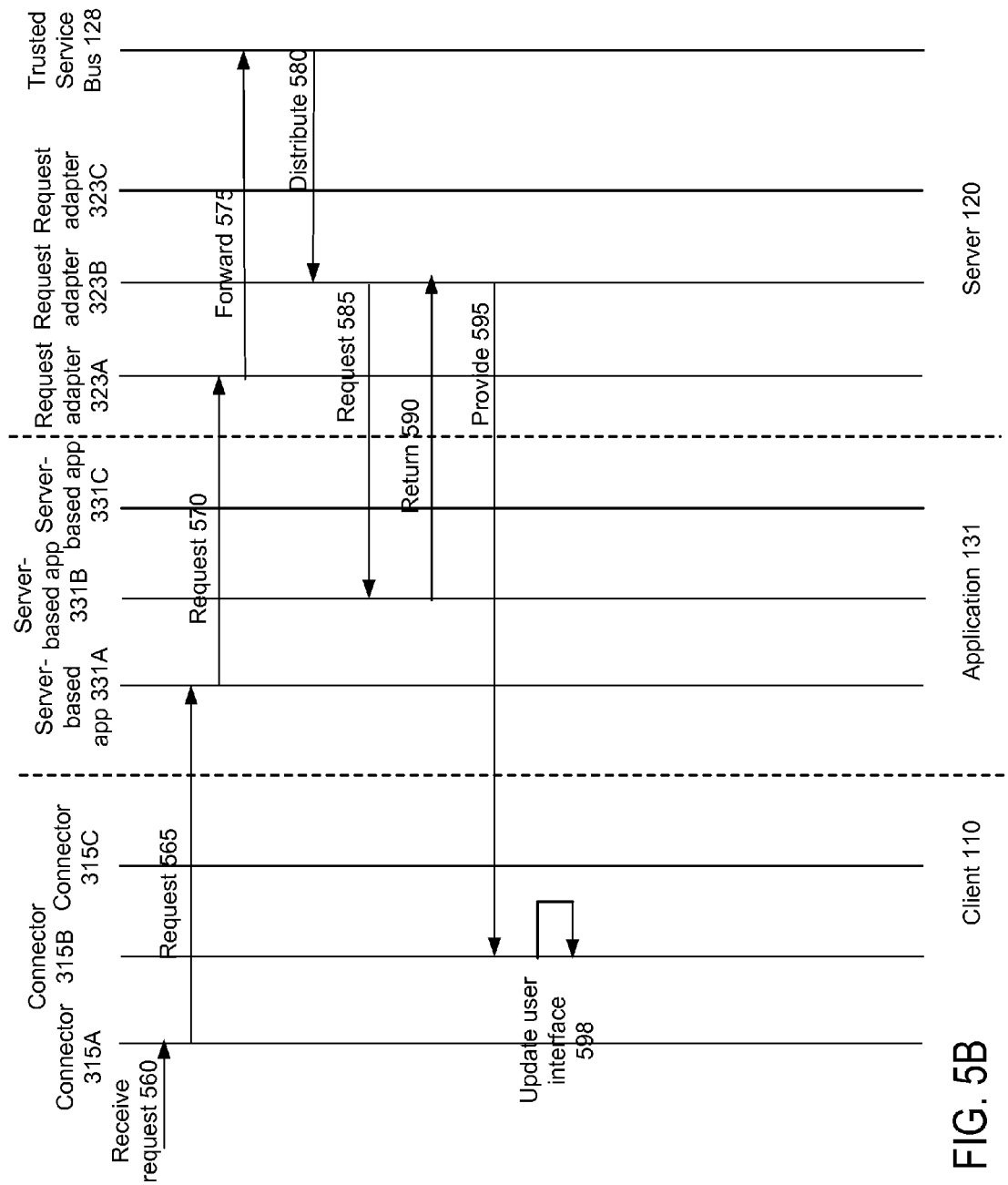

FIGS. 5A and 5B illustrate interactions within the environments of FIG. 3 to make application requests of other domains, according to one embodiment. Specifically, FIG. 5A illustrates interactions for looking up a set of data items, such as querying for all emails for the current user in a messaging application, or querying for a set of search results in a search application. Initially, the connector 315A running in domain 111A on the client 110 receives 505 a request for the set of data items from the client application 317, such as all email messages (or message headers) for the current user. For example, the request might be received via the web-based user interface 410 of FIG. 4 in response to the user interface being loaded. In response, the connector 315A makes a request 510 over the network 140 to the server-based application 331A, which is running in the same domain as the connector 155A. The server-based application 331A then determines which domains the request is for, based on the data of the request. The set of domains in which to execute the request may be explicitly specified, such as in a request to obtain data items from domains 111A and 111B. Alternatively, the domains may be implicitly specified by the type of the request, such as a request to open the user's inbox in all domains in which the user has an identity, which causes execution of a request to obtain messages for domain 111A, 111B, and 111C. Since in the example of FIG. 5A the request is for data items in multiple domains, including a domain other than that from which the request originated, the server-based application 331A provides the request 515 to the request adapter 323A on the server 120, which runs in the same domain as the server-based application.

The request adapter 323A may generate a version of the request appropriate for the various domains, such as translating a request for the messages for all domains to multiple distinct requests for messages, one per domain. In one embodiment, the request adapter 323A does not translate the request for its own domain, given that the request originated from that domain and the request adapter has already learned of the request.

The request adapter 323 provides 520 each generated request to the trusted service bus 128. The trusted service bus 128 performs a series of checks on the generated requests to ensure that they do not violate any security constraints. For example, the trusted service bus 128 may apply filters or validators 327 as part of a workflow predefined for each type of request (e.g., creating an email folder), such as ensuring that the request does not exceed some maximum message length, or that there have not already been too many actions in a given timeframe. The trusted service bus 128 further maps the principal identity for the source domain to the matching principal identity in each target domain. At the conclusion of the series of checks, the trusted service bus 128 distributes 525 the requests (optionally, subject to their successful filtering/validation) to the appropriate request adapters 323 in the different domains. For example, assuming the request adapter 323A generated a request only for domains 111B and 111C, the trusted service bus 128 would distribute the requests to those domains, but not to domain 111A. Each request adapter then provides 530 the request to the corresponding server-based application 331 running in its domain. The server-based applications 331 then respond 535 by providing the requested data back to the request adapters 323. Since the request originated from domain 111A, the data is provided back to the request adapter 323A for delivery back to the connector 315A. To that end, the request adapters 323B and 323C return 540 the data to the trusted service bus 128, which in turn returns 545 the data to the request adapter 323A by moving the data across domains.

The request adapter 323A, having received the data for each of the domains, then returns 550 the data to the connector 315A on the client 110, from which the request originated. The connector 315A accordingly updates the user interface to reflect the received data, such as by displaying the messages within the message area 412.

In one embodiment, interactions similar to those described in FIG. 5A are used to establish a session between higher and lower domains, such that the lower domains can notify the higher domains of any changes and the higher domains update their user interfaces accordingly. In this embodiment, the request received 505 by the connector 315A is to establish a connection, e.g., with domains 121B and 121C. Specifically, the connector 315A passes the request 510 to establish a session with the server-based application 331A, and the request is distributed and data returned as in steps 515-550 of FIG. 5A. However, the data returned includes session identifiers, which are stored by the client application 317A. Then, when data in the lower domains 121B or 121C changes (e.g., new email messages arrive), the client applications 317B and 317C send a message to client application 317A via the trusted service bus 128, the messaging including the session identifiers and data corresponding to the change (e.g., data for a new email message). The client application 317A then verifies the session identifier and updates its user interface to reflect the provided data on the change.

FIG. 5B illustrates interactions in the context of a different example request: a request to view a given message. First, a request is specified, e.g. by the user double-clicking on one of the messages of the messages area 412 of FIG. 4, and accordingly received 560 by the client connector 315 on the client 110. Referring back to the example of FIG. 4, the user has selected a message ("Meadowlark Fund Transfers") sent Apr. 5, 2007 and marked with an "S" image to indicate that it exists in the "Secret" domain 111B. In the current example, the request need only be sent to the domain containing the message, e.g. the "Secret" domain 111B, rather than all domains. Thus, the connector 315A provides 565 the request to the server-based application 331A, which notes that the request is destined for a different domain—namely, the "Secret" domain 111B. The server-based application 331A accordingly distributes 570 the request to its corresponding request adapter 323A on the server 120. The request adapter 323A determines that the request is destined only for domain 111B, and forwards 575 the request to the trusted service bus 128, which distributes 580 the request to the request adapter 323B of domain 111B. The request adapter 323B in turn distributes 585 the request to the server-based application 331B, which returns 590 the data for the requested message back to the request adapter 323B. The request adapter 323B provides 540 the message data to the connector 315B on the client 110, which updates 598 the user interface by causing the window 420 to be displayed and populating it with the message data.

Thus, the above-discussed techniques provide the client 110 with the data and/or user interface needed to implement a secure multi-level application, without the client itself having to handle the inter-domain security aspects that constitute a potential security risk.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
receiving a request for application content metadata from a first instance of a single-level application executing in a first domain of a plurality of security domains of a client device, the request to be executed in at least the first domain and in a second domain of the plurality of security domains that has a different corresponding security level than the first domain, the first domain being implemented by a first operating system instance running in a first virtual machine, and the second domain being implemented by a second operating system instance running in a second virtual machine;
executing the request in the first domain, thereby producing a first set of application metadata items corresponding to a first set of application content items accessible to a user;
providing the request to the second domain;
obtaining, from the second domain, a second set of application metadata items corresponding to a second set of application content items accessible to the user;
aggregating the first set of application metadata items and the second set of application metadata items into an aggregated set of application metadata items;
providing the aggregated set of application metadata items to the first instance of the single-level application for display within a user interface of the first instance in the first domain, thereby providing a consolidated view of metadata from multiple security domains;
receiving a selection of one of the application metadata items;
determining that an application content item corresponding to the selected application metadata item is stored in the second domain; and
providing a display request to the second domain to display the application content item corresponding to the selected application metadata item within a user interface of a second instance of the single-level application executing within the second domain.

2. The computer-implemented method of claim 1, wherein the security domains are arranged in a hierarchy of corresponding security levels, each domain having associated resources that are accessible only to that domain or domains with higher security levels.

3. The computer-implemented method of claim 1, wherein a trusted service bus provides the request to the second domain by writing the request to a shared memory area accessible to the first virtual machine and to the second virtual machine.

4. The computer-implemented method of claim 1, wherein at least one of the first operating system instance and the second operating system instance is a single-level operating system.

5. The computer-implemented method of claim 1, further comprising providing a result of executing the request in the second domain to an application executing on the client device in the second domain.

6. The computer-implemented method of claim 1, further comprising displaying to the user, by the second instance of the single-level application executing in the second domain, data corresponding to the selected application metadata item.

7. A computer server system comprising:
a hardware computer processor; and
a non-transitory computer-readable storage medium storing a computer program executable by the computer processor and performing actions comprising:
receiving a request for application content metadata from a first instance of a single-level application executing in a first domain of a plurality of security domains of a client device, the request to be executed in at least the first domain and in a second domain of the plurality of security domains that has a different corresponding security level than the first domain, the first domain being implemented by a first operating system instance running in a first virtual machine, and the second domain being implemented by a second operating system instance running in a second virtual machine;

executing the request in the first domain, thereby producing a first set of application metadata items corresponding to a first set of application content items accessible to a user;
providing the request to the second domain;
obtaining, from the second domain, a second set of application metadata items corresponding to a second set of application content items accessible to the user;
aggregating the first set of application metadata items and the second set of application metadata items into an aggregated set of application metadata items;
providing the aggregated set of application metadata items to the first instance of the single-level application for display within a user interface of the first instance within the first domain;
receiving a selection of one of the application metadata items;
determining that an application content item corresponding to the selected application metadata item is stored in the second domain; and
providing a display request to the second domain to display the application content item corresponding to the selected application metadata item within a user interface of a second instance of the single-level application executing within the second domain.

8. The computer server system of claim 7, wherein the security domains are arranged in a hierarchy of corresponding security levels, each domain having associated resources that are accessible only to that domain or domains with higher security levels.

9. The computer server system of claim 7, wherein a trusted service bus provides the request to the second domain by writing the request to a shared memory area accessible to the first virtual machine and to the second virtual machine.

10. The computer server system of claim 7, wherein at least one of the first operating system instance and the second operating system instance is a single-level operating system.

11. A computer-implemented method of providing a remote Multiple Independent Level Security (MILS) client device with an application that spans a plurality of different security domains, each domain implemented by a different operating system instance running in a distinct hypervisor, the method comprising:
receiving, by a server, a request for email headers from a first instance of a single-level email application executing in a first domain of the plurality of security domains of the client device, the request to be executed in at least the first domain and in a second domain of the plurality of security domains that is different from the first domain;
executing, by the server, the request in the first domain, thereby producing a first set of email headers corresponding to a first set of emails accessible to a user;
providing, by the server, the request to the second domain via a trusted service bus;
executing, by the server, the request in a second instance of the single-level email application executing in the second domain, thereby producing a second set of email headers corresponding to a second set of emails accessible to the user;
aggregating the first set of email headers and the second set of email headers into an aggregated set of email headers;
providing the aggregated set of email headers to the first instance of the single-level email application of the remote client device for display within a user interface of the first instance within the first domain;
receiving a selection of one of the email headers from the aggregated set of email headers within the user interface;
determining that an email corresponding to the selected one of the email headers is stored in the second domain;
providing a display request to the application in the second domain to display the email corresponding to the selected one of the email headers within a user interface executing within the second domain; and
displaying to the user, by the application in the second domain, the email corresponding to the selected one of the email headers.

12. The computer-implemented method of claim 11, wherein the first domain is implemented by a first operating system instance running in a first virtual machine, and the second domain is implemented by a second operating system instance running in a second virtual machine.

13. A computer-implemented method comprising:
receiving a request for application content metadata from a first instance of a single-level application executing in a first domain of a plurality of security domains of a client device, the request to be executed in at least the first domain and in a second domain of the plurality of security domains that has a different corresponding security level than the first domain, the first domain and the second domain being implemented by an operating system providing Multi-Level Security (MLS) that provides functionality for accessing, from the first domain, resources of the second domain;
executing the request in the first domain, thereby producing a first set of application metadata items corresponding to a first set of application content items accessible to a user;
providing the request to the second domain;
obtaining, from the second domain, a second set of application metadata items corresponding to a second set of application content items accessible to the user;
aggregating the first set of application metadata items and the second set of application metadata items into an aggregated set of application metadata items;
providing the aggregated set of application metadata items to the first instance of the single-level application for display within a user interface of the first instance in the first domain, thereby providing a consolidated view of metadata from multiple security domains;
receiving a selection of one of the application metadata items;
determining that an application content item corresponding to the selected application metadata item is stored in the second domain; and
providing a display request to the second domain to display the application content item corresponding to the selected application metadata item within a user interface of a second instance of the single-level application executing within the second domain.

14. The computer-implemented method of claim 13, wherein a trusted service bus provides the request to the second domain by sending the request to the second domain via a multi-level port provided by the MLS operating system.

15. The computer-implemented method of claim 13, wherein the security domains are arranged in a hierarchy of corresponding security levels, each domain having associated resources that are accessible only to that domain or domains with higher security levels.

16. The computer-implemented method of claim 13, further comprising providing a result of executing the request in the second domain to an application executing on the client device in the second domain.

17. The computer-implemented method of claim 13, further comprising displaying to the user, by the second instance of the single-level application executing in the second domain, data corresponding to the selected application metadata item.

\* \* \* \* \*